United States Patent [19]
Hofmann

[11] Patent Number: 5,199,316
[45] Date of Patent: Apr. 6, 1993

[54] FULLY-SYNCHRONIZED MULTIPLE SPEED MANUAL TRANSMISSION FOR MOTOR VEHICLES

[75] Inventor: Harald Hofmann, Cologne, Fed. Rep. of Germany

[73] Assignee: Ford Motor Company, Dearborn, Mich.

[21] Appl. No.: 862,686

[22] Filed: Apr. 3, 1992

[30] Foreign Application Priority Data

May 18, 1991 [DE] Fed. Rep. of Germany ....... 4116418

[51] Int. Cl.$^5$ .............................................. F16H 3/08
[52] U.S. Cl. ...................................... 74/360; 74/331; 74/339
[58] Field of Search ................. 74/331, 339, 356, 357, 74/359, 360, 606 R

[56] References Cited

U.S. PATENT DOCUMENTS

| | | | |
|---|---|---|---|
| 3,280,650 | 10/1966 | Clement | 74/339 |
| 3,527,113 | 9/1970 | Detra et al. | 74/339 |
| 4,398,432 | 8/1983 | Quick | 74/360 X |
| 4,640,141 | 2/1987 | Knödel et al. | 74/357 |
| 4,776,227 | 10/1988 | Janiszewski | 74/359 X |
| 4,799,395 | 1/1989 | Janiszewski | 74/331 |
| 5,031,473 | 7/1991 | Yumoto et al. | 74/359 |
| 5,081,878 | 1/1992 | Stasiuk | 74/331 X |
| 5,085,092 | 2/1992 | Koga | 74/357 X |

FOREIGN PATENT DOCUMENTS

| | | |
|---|---|---|
| 0128319 | 12/1984 | European Pat. Off. . |
| 1822397 | 10/1960 | Fed. Rep. of Germany . |
| 2036208 | 6/1980 | United Kingdom . |

Primary Examiner—Richard M. Lorence
Assistant Examiner—Benjamin Levi
Attorney, Agent, or Firm—Frank G. McKenzie; Roger L. May

[57] ABSTRACT

A multiple-speed gearbox for motor vehicles with synchronization of all gears, includes driving and driven shafts journaled in a gear/differential case, a reverse gear axle and a differential/axle drive with axle driving shafts. The driving shaft carries fixed and loose gearwheels that engage with corresponding loose and fixed gearwheels on the driven shaft. Synchronizing units are arranged between respective pairs of loose gearwheels. The synchronizing unit for the first and second gears is arranged on the end remote from the input of the driving shaft. Loose gearwheels for the first and second gears are arranged on the driving shaft (4), and the corresponding fixed gearwheels are formed on the driven shaft.

14 Claims, 1 Drawing Sheet

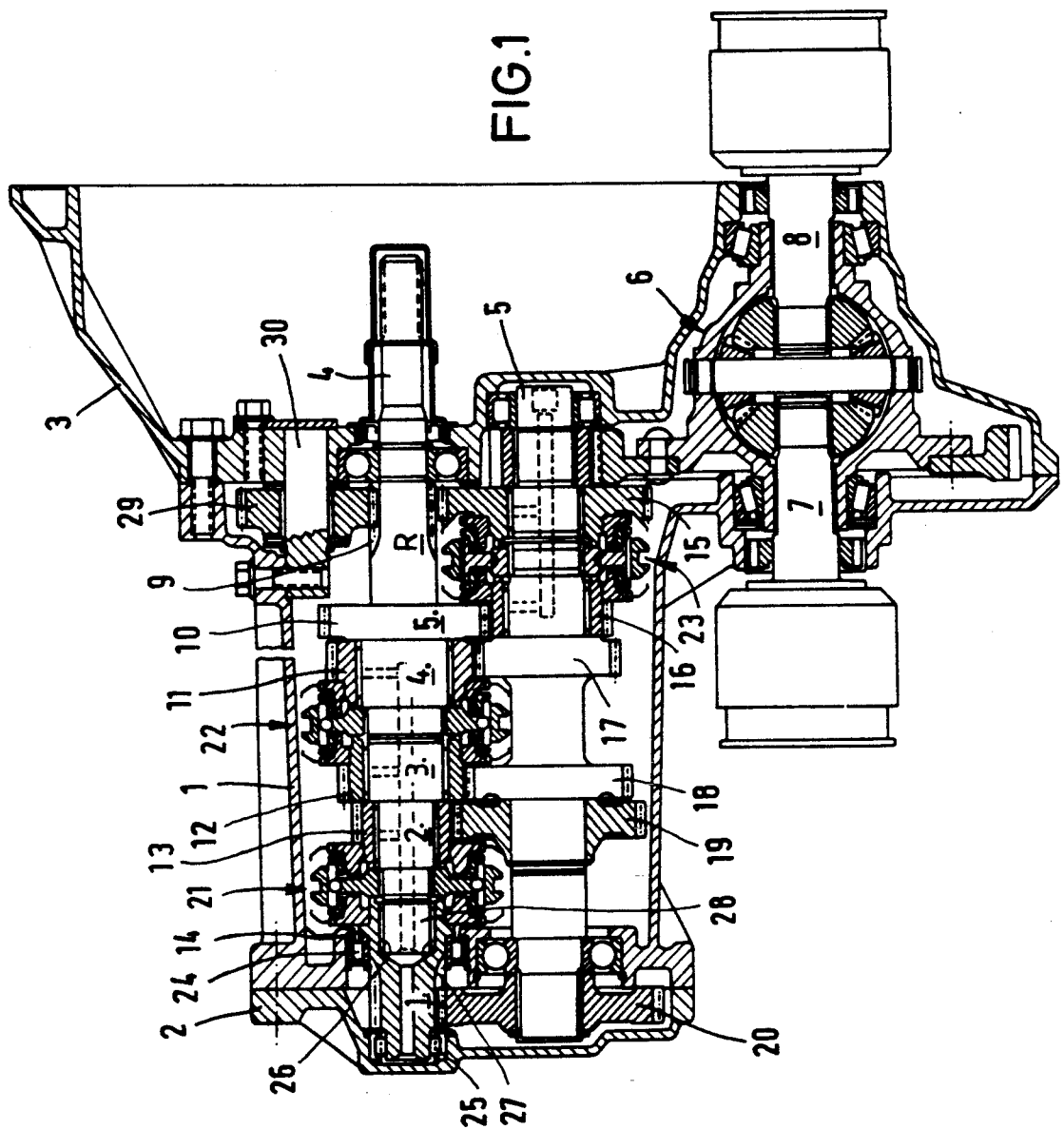
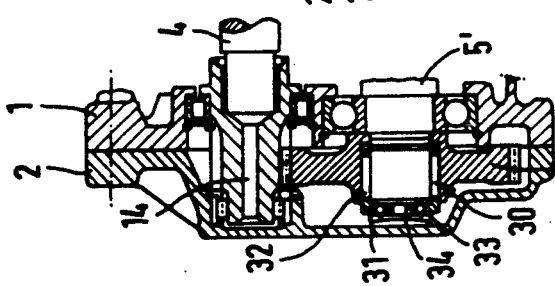

FULLY-SYNCHRONIZED MULTIPLE SPEED MANUAL TRANSMISSION FOR MOTOR VEHICLES

BACKGROUND OF THE INVENTION

1. Field of the Invention

The invention relates to a multiple-speed, fully synchronized manual transmission for motor vehicles.

2. Description of the Prior Art

European Patent Document EP-B-O 128 319 describes a multiple-speed transmission for motor vehicles. The driving shaft of the transmission carries both fixed and loose gearwheels that mesh with corresponding loose and fixed gearwheels on the driven shaft. Between each pair of adjacent loose gearwheels there is located a synchronizing unit of conventional design to enable the adjacent loose gearwheels to be connected to their corresponding shafts.

It is a disadvantage of this gearbox that the synchronizing unit for the first and second gear is located on the driven shaft because the force required to produce synchronized gear shifts between first and second gear is greater, and the time required to make such gear shifts is longer, by about the transmission ratio of the first or second gear than would be the case if the synchronizing unit were located on the driving shaft.

This item has been universally accepted as a disadvantage by those skilled in the art because the usual reduction ratios of the individual gears in a multiple-speed gearbox and the resulting diameters of the various sets of gearwheels do not allow for a synchronizer to be located on the driving shaft if the shafts and gearwheels are of a size such that they have adequate strength.

SUMMARY OF THE INVENTION

It is an object of the invention to provide a change-speed gearbox for motor vehicles having fully synchronized gears such that the synchronizer for the first and second gears is located on the driving shaft yet without causing insuperable difficulties in accommodating the size of the associated gearwheels.

Locating the synchronizer assembly for the first and second gears on the end of the driving shaft remote from the power input makes it possible, by reducing the diameter of the driving shaft, to mount the loose gearwheel for the first gear on the driving shaft also.

Another embodiment of the invention is useful if the loose pinion of the first gear ratio needs to have a still smaller diameter than would be acceptable for reasons of strength due to a stepwise reduction in diameter of the driving shaft.

The loose pinion for the first gear is in the form of a sleeve that is supported at one end in the housing by way of a first bearing and at the other end in a housing cover by way of a second bearing The free end of the driving shaft is supported in a bearing housing by a needle-roller bearing. In this way, the required diameter of the pinion for the first gear can be obtained independently of the diameter of the mounting required for the free end of the driving shaft.

Furthermore, excessively high relative speeds of rotation between the loose gearwheel for the first gear and the driving shaft can be avoided.

This invention also results in an advantageous arrangement of the synchronizing unit for the fifth gear and the reverse gear. These components are arranged on the driven shaft immediately adjoining a differential/axle drive, whereby the space required for the reversing gearwheel of the reverse gear mechanism is arranged in the front part of the gearbox, where more room is provided in the radial direction by the adjoining bell-shaped clutch case.

BRIEF DESCRIPTION OF THE DRAWINGS

The invention will now be described in more detail, by way of example, with reference to two embodiments shown in the accompanying drawings, in which:

FIG. 1 is a cross section through the gear arrangement of a multiple-speed gearbox according to the invention.

FIG. 2 is a partial vertical cross section through the gear and pinion that produce the first gear ratio in another embodiment of the invention.

DESCRIPTION OF THE PREFERRED EMBODIMENT

A multiple-speed gearbox for motor vehicles includes a gear housing 1, a rear cover 2 and a front clutch/differential housing 3. Within these housings, a driving shaft 4, a driven shaft 5, and a differential/axle drive 6 having axle driving shafts 7 and 8 are rotatably mounted by means of respective bearing assemblies.

On the driving shaft 4, starting from the input end, are mounted pinions for the reverse drive, the fifth speed ratio, the fourth speed ratio, the third speed ratio, the second speed ratio and the first speed ratio. The teeth 9 of the reverse pinion are machined integrally with the driving shaft 4, as is a fixed pinion 10 for the fifth speed ratio. These are followed by a loose pinion 11, journaled on the surface of shaft 4, for the fourth speed and a loose pinion 12 for the third speed. Thereafter, continuing further along shaft 4, a loose pinion 13 for the second speed and a loose pinion 14 for the first speed are journaled on the shaft.

On the driven shaft 5, starting from the output end, are arranged a loose gearwheel 15 for reverse drive and a loose gearwheel 16 for the fifth speed ratio. Integral, fixed gearwheels 17 and 18 for the fourth and third speed ratios, respectively, are formed on the driven shaft. Fixed gearwheels 19 and 20 for the second and first speed ratios, non-rotatable with respect to the driven shaft 5, are located further along shaft 5.

The pinion 9 for the reverse gear meshes first with a reversing gearwheel 29, which is mounted rotatably on a reverse gear axle 30 and meshes with the loose gearwheel 15 for the reverse gear. The relatively larger diameter gearwheels for reverse drive are arranged in the part of the housing 1 that adjoins the larger diameter clutch/differential housing 3.

Between the loose pinions 13 and 14 there is located a synchronizer unit 21. Between the loose pinions 11 and 12 there is a synchronizer unit 22, and between the loose gearwheels 15 and 16 there is a synchronizer unit 23.

Each synchronizer unit consists essentially of a synchronizer hub connected non-rotatably to the driving shaft 4 or the driven shaft 5 and a corresponding axially displaceable operating sleeve, which, when displaced, can act by way of locking rings on synchronizer cones on the loose gearwheels and pinions and thereafter engage with corresponding coupling dog teeth on the gearwheels and pinions.

The synchronizing units 21, 22, and 23 can be of any construction known to those skilled in the art.

FIG. 1 shows a particular embodiment of the invention that is useful when the diameter of the loose pinion 14 for the first speed ratio is smaller than strength requirements allow the free end of the driving shaft 4 to be made. For this case, the loose pinion 14 for the first speed ratio is made in the form of a sleeve, supported on a first bearing 24 on the rear housing 1 and in a second bearing 25 on the rear cover 2. Pinion 14 has, at its end facing the rear housing 1, a bearing housing in which the free end 28 of the driving shaft 4 is supported by way of a needle-roller bearing 27.

FIG. 2 shows a modified embodiment of the invention, which prevents the occurrence of excessively high speeds of the loose pinion 14 relative to the driving shaft 4.

For this purpose, a fixed gearwheel 20' for the first gear ratio is not connected directly to the driving shaft 5' by splines, but an engageable roller-type overrunning clutch 30 of a suitable known construction is located between the driven shaft 5' and the fixed gearwheel 20' for the first gear. One-way clutch 30 is operated so that it disengages, overruns or free-wheels at least during operation in the higher gears ratios, e.g., in the third to fifth speed ratios.

The retaining elements 32 of the overrunning roller-type clutch 30 are guided in a cage 31 and can be switched by way of an axial ball-bearing 33, guided by the same cage 31, against which an actuator 34 presses axially so as to influence rotation of the cage 31.

Having described the preferred embodiment of my invention, what I claim and desire to secure by U.S. Letters Patent is:

1. A manual transmission for producing multiple ratios of the speeds at an input end and an output end of the transmission, comprising:
    a driving shaft and a driven shaft, the shafts being parallel and supported for rotation about their respective axes;
    multiple pairs of intermeshing pinions and gears, each pair associated with a speed ratio, one member of each pair supported on the driving shaft, the other member of each pair supported on the driven shaft; and
    a first synchronizer means located at the end of the driving shaft remote from the input end, for selectively driveably connecting the pinions of first and second speed ratio pairs to the driving shaft.

2. The transmission of claim 1 wherein the pinion of the pinion-gear pair associated with the first speed ratio is a sleeve coaxial with the driving shaft, the sleeve encircling a portion of the driving shaft and containing a first bearing supporting the driving shaft in rotation.

3. The transmission of claim 1 further comprising:
    a housing defining a space; and
    cover means for closing an end of the housing wherein the pinion associated with the first speed ratio is supported for rotation by a bearing located in said housing and by a bearing located in said housing cover.

4. The transmission of claim 2 further comprising:
    a housing defining a space; and
    cover means for closing an end of the housing, wherein the pinion associated with the first speed ratio is supported for rotation by a bearing located in said housing and by a bearing located in said housing cover.

5. The transmission of claim 1 further comprising overrunning clutch means carried on the driven shaft for producing a one-way drive connection between the driven shaft and the gear of the pinion-gear pair associated with the first speed ratio.

6. The transmission of claim 5 wherein the overrunning clutch means produces a one-way drive connection between the driven shaft and the gear of the pinion-gear pair associated with the first speed ratio.

7. The transmission of claim 1 further comprising:
    a reverse drive mechanism including intermeshing pinions and gears, one member of said mechanism supported on the driven shaft, another such member supported on the driving shaft; and
    a second synchronizing unit located on the driven shaft for driveably connecting a gear of a second pinion-gear pair and a gear of said reverse drive mechanism to the driven shaft.

8. A manual transmission for producing multiple ratios of the speeds at an input end and an output end of the transmission, comprising:
    a driving shaft and a driven shaft, the shafts being parallel and supported for rotation about their respective axes;
    multiple pairs of intermeshing pinions and gears, each pair associated with a speed ratio, one member of each pair supported on the driving shaft, the other member of each pair supported on the driven shaft;
    first synchronizer means located at the end of the driving shaft remote from the input end, for selectively drivably connecting the pinions of first and second speed ratio pairs to the driving shaft; and
    second synchronizer means for selectively drivably connecting the pinions of third and fourth speed ratio pairs to the driving shaft.

9. The transmission of claim 8 wherein the pinion of the pinion-gear pair associated with the first speed ratio is a sleeve coaxial with the driving shaft, the sleeve encircling a portion of the driving shaft and containing a first bearing supporting the driving shaft in rotation.

10. The transmission of claim 8 further comprising:
    a housing defining a space; and
    cover means for closing an end of the housing, wherein the pinion associated with the first speed ratio is supported for rotation by a bearing located in said housing and by a bearing located in said housing cover.

11. The transmission of claim 9 further comprising;
    a housing defining a space; and
    cover means for closing an end of the housing, wherein the pinion associated with the first speed ratio is supported for rotation by a bearing located in said housing and by a bearing located in said housing cover.

12. The transmission of claim 8 further comprising overrunning clutch means carried on the driven shaft for producing a one-way drive connection between the driven shaft and the gear of the pinion-gear pair associated with the first speed ratio.

13. The transmission of claim 12 wherein the overrunning clutch means produces a one-way drive connection between the driven shaft and the gear of the pinion-gear pair associated with the first speed ratio.

14. The transmission of claim 8 further comprising:
    a reverse drive mechanism including intermeshing pinions and gears, one member of said mechanism supported on the driven shaft, another such member supported on the driving shaft; and
    third synchronizing means located on the driven shaft for driveably connecting a gear of a fifth speed ratio pair and a gear of said reverse drive mechanism to the driven shaft.

* * * * *